(12) United States Patent
Alfano

(10) Patent No.: US 10,375,900 B2
(45) Date of Patent: Aug. 13, 2019

(54) RAIN INDUCED BY SUPERCONTINUUM LASER BEAMS

(71) Applicant: Robert Alfano, New York, NY (US)

(72) Inventor: Robert Alfano, New York, NY (US)

(*) Notice: Subject to any disclaimer, the term of this patent is extended or adjusted under 35 U.S.C. 154(b) by 0 days.

(21) Appl. No.: 15/928,766

(22) Filed: Mar. 22, 2018

(65) Prior Publication Data

US 2018/0271034 A1 Sep. 27, 2018

Related U.S. Application Data

(60) Provisional application No. 62/475,538, filed on Mar. 23, 2017.

(51) Int. Cl.
A01G 15/00 (2006.01)

(52) U.S. Cl.
CPC ..................... *A01G 15/00* (2013.01)

(58) Field of Classification Search
CPC ....................................................... A01G 15/00
USPC .................. 239/2.1, 14.1; 356/432, 450, 451
See application file for complete search history.

(56) References Cited

U.S. PATENT DOCUMENTS

| 4,402,480 A * | 9/1983 | Udell | B64G 1/1021 244/158.1 |
| 4,671,805 A * | 6/1987 | Gourdine | B03C 3/16 239/14.1 |
| 6,281,969 B1 * | 8/2001 | Gelbwachs | G01S 17/10 356/5.01 |
| 7,391,557 B1 * | 6/2008 | Bruch | G01J 3/10 356/450 |
| 2010/0208267 A1 * | 8/2010 | Rogers | G01N 21/3504 356/432 |
| 2014/0145002 A1 * | 5/2014 | Caldeira | A01G 15/00 239/2.1 |

OTHER PUBLICATIONS

Cooper, C. F., and W. C. Jolly. Ecological effects of silver iodide and other weather modification agents. Water Resour. Res. 1970. 6(1), 88-98.

Philipp Rohwetter, Jéôrome Kasparian, et. al. Laser-Induced Water Condensation in Air. Nature Photonics 2010. 4, 451-456.

(Continued)

*Primary Examiner* — Steven J Ganey
(74) *Attorney, Agent, or Firm* — Myron Greenspan; Lackenbach Siegel LLP

(57) ABSTRACT

A chemical-free, laser-induced rain method uses supercontinuum (SC) generation by 800 nm 100 fs ultra high power laser beams to produce photoionization in optical filaments and application of Gaussian(G) and Laguerre Gaussian (LG) beams. The SC is used to produce multiple filamentations and micro particle manipulation in the atmosphere with obvious applications in arid or drought ridden areas. Two salient steps are used to induce rain: 1) high peak power filament inducing laser pulses to ionize air molecules and preexisting aerosols, and 2) manipulation of nano and micro sized particles using special function beams as potential particle traps, such as the Laguerre Gaussian and Gaussian beams. The outcome is a clean, safe, efficient method for inducing rain. The application is not just limited to rain induction but can also be used in clearing dust and cloud clearing formations.

16 Claims, 2 Drawing Sheets

(56) References Cited

OTHER PUBLICATIONS

P. Joly, M. Petrarca, et. al. Laser-induced condensation by ultrashort laser pulses at 248 nm. Applied Physics Letters 2013. 102, 091112.
R. R. Alfano and S. L. Shapiro, Observation of Self-Phase Modulation and Small Scale Filaments in Crystals and Glasses, Phys. Rev. Lett. 24, 592-594 (1970).
R. R. Alfano and S. L. Shapiro, Emission in the Region from 4000 to 7000 Å via Four Photon Coupling in Glass, Phys. Rev. Lett. 24, 584-587 (1970).
R. R. Alfano and S. L. Shapiro, Direct Distortion of Electronic Clouds of Rare Gas Atoms in Intense Electric Fields, Phys. Rev. Lett. 24, 1217-1220 (1970).
N. Bloembergen, The Influence of Electron Plasma Formation on Superbroadening in Light Filaments. Optics Communications. 1973. 8, 285-288.
Luat T. Vuong, Taylor D. Grow, Amiel Ishaaya, Alexander L. Gaeta, Gert W. 't Hooft, Eric R. Eliel, and Gadi Fibich, Collapse of Optical Vortices, Phys. Rev. Lett. 96, 133901 (2006).
Andrey Novitsky, Cheng-Wei Qiu, and Haifeng Wang. Phys. Rev. Lett. 2011. 107, 203601.
A. Ashkin. Applications of Laser Radiation Pressure. Science 1980. 210, 1081-1088.
G. G. Goyer, J. E. McDonald, F. Baer, and R. R. Braham Jr., Effects of Electric Field on Water-Droplet Coalescence. J. Meteor. 1960. 17, 442-445.
The Supercontinuum Laser Source: Fundamentals with Updated References, 2nd ed. R. R. Alfano, editor, Springer, New York, 2006.

\* cited by examiner

RAIN INDUCED BY SUPERCONTINUUM LASER BEAMS

BACKGROUND OF THE INVENTION

1. Field of the Invention

The invention generally relates to methods of inducing rain over arid or drought-ridden areas and, more specifically, to rain induced by supercontinuum laser beams.

2. Description of the Prior Art

Currently, rain induction methods involves seeding chemicals such a silver nitrate ions[1] which could produce negative impact on the environment. With the advent of commercially available ultra high power compact ultrafast laser technology new methods to induce rain by high intensity light beams are proposed. These early laser studies have mostly been focused on laser pulses at 800 nm to activate nucleation and growth in laboratory chambers and only limited research in the free atmosphere. Seven years ago Rohwetter et. al.[2] used Teramobile laser to research laser-induced water condensation in diffusion chamber and performed limited work in free atmosphere. They used back-scattered light to evaluate efficiency of air filamentation as a cause of water condensation. However, they did not determine amount of rain from different states in the atmosphere. No marker for onset of rain was used.

Another approach that has been proposed is to use ultra-short UV laser pulses which are expected to offer a much more efficient activation of nucleation and growth in the atmosphere since it requires less photons than the NIR region[3]; however, UV light propagation in the atmosphere is much worse than NIR and it may be harmful for humans.

SUMMARY OF THE INVENTION

A novel method that develops a chemical-free, laser-induced rain uses supercontinuum (SC) generation by 800 nm 100 fs ultra high power laser beams to produce photoionization optical filaments and application of Gaussian (G) and Laguerre Gaussian (LU) beams. The SC is used to produce multiple filamentations and micro particle manipulation in atmosphere with obvious applications in arid or drought ridden areas.

Two salient phenomena are disclosed to induce rain: 1) the use of high peak power filament inducing laser pulses to ionize air molecules and preexisting aerosols, and 2) manipulation of nano and micro sized particles using special function beams as potential particle traps, such as the Laguerre Gaussian and Gaussian beams. The outcome is a clean, safe, efficient method for inducing rain. The application is not just limited to rain induction but can also be used in clearing dust and cloud clearing formations.

BRIEF DESCRIPTION OF THE DRAWINGS

The above and other aspects, features and advantages of the present invention will be more apparent from the following description when taken in conjunction with the accompanying drawings, in which.

DESCRIPTION OF THE INVENTION

An efficient laser-induced rain method and apparatus is based on the generation of supercontinuum (SC) by 800 nm high power laser beams and application of structured Laguerre Gaussian and Gaussian with obvious applications in arid or drought-ridden areas.

Rain is needed in these areas. The generation of various amount of SC in a laser beam Will be a key fingerprint marker to maximize the condensation and production of rain. The method is based on plasma generation in filaments formed by short, intense light pulses in condensed matter. This phenomena is followed by pronounced spectral broadening of laser pulses now called supercontinuum, first observed by Alfano and Shapiro and published in three seminal papers[4-6], Bloembergen[7] showed that plasma channels via ionization along with the optical Kerr effect allows for powerful pulses to propagate much further without diverging and still maintain power. The anti stokes blue portion of SC spectra is a key signature of ion and plasma production. The plasma from ions cause clusters in cloud and air. The blue SC will be a marker to produce maximum condensation. These processes to induce rain involve non-linear changes in index of refraction for the medium by which the pulse propagates. The self-focusing beam creates many ions and free electrons along its path, which can serve as sites for cloud nucleation events to occur, and the dispersing charges from the plasma will act as local electromagnetic field fluctuations as they propagate. Rain production will be correlated with the blue side of SC spectra as a marker for rain.

Figure 1:
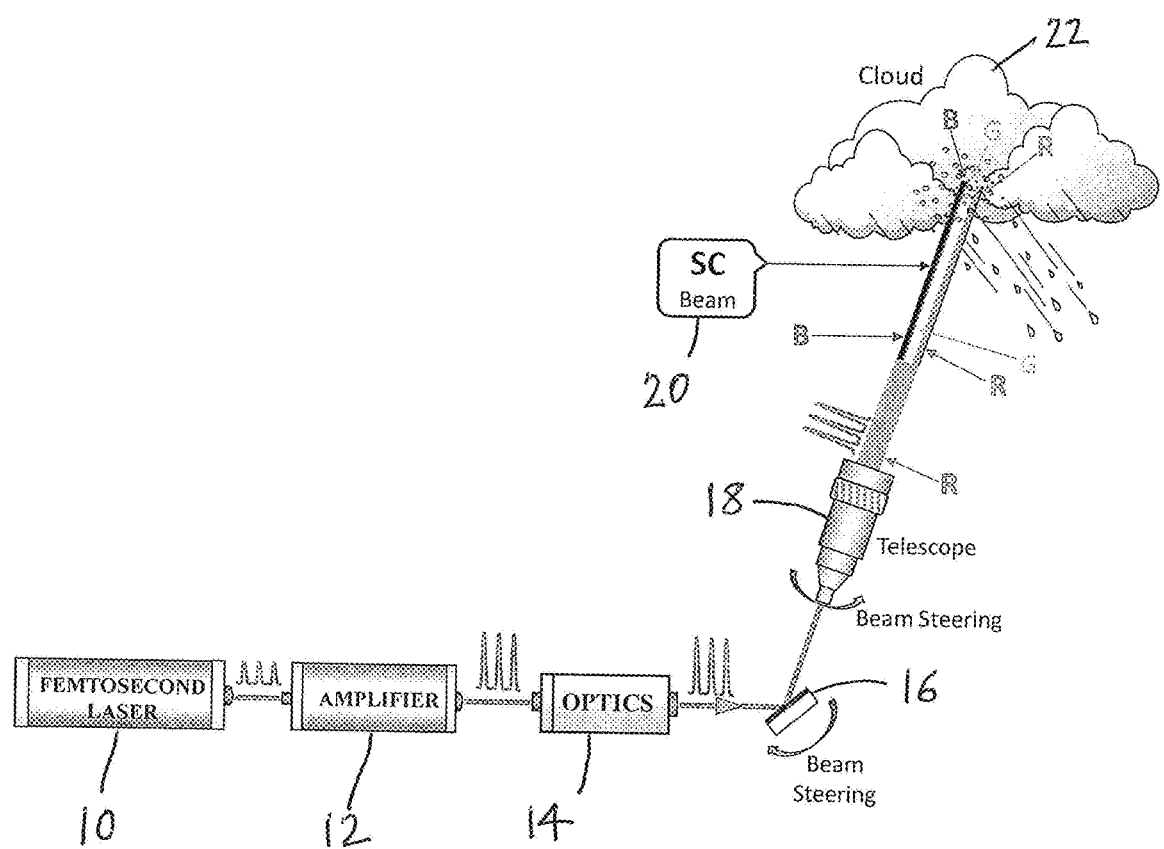
FIG. 1 is a schematic representation of a system and method of inducing rain by means of directing supercontinuum laser beams in a predetermined direction at overhead clouds.
Figure 2:
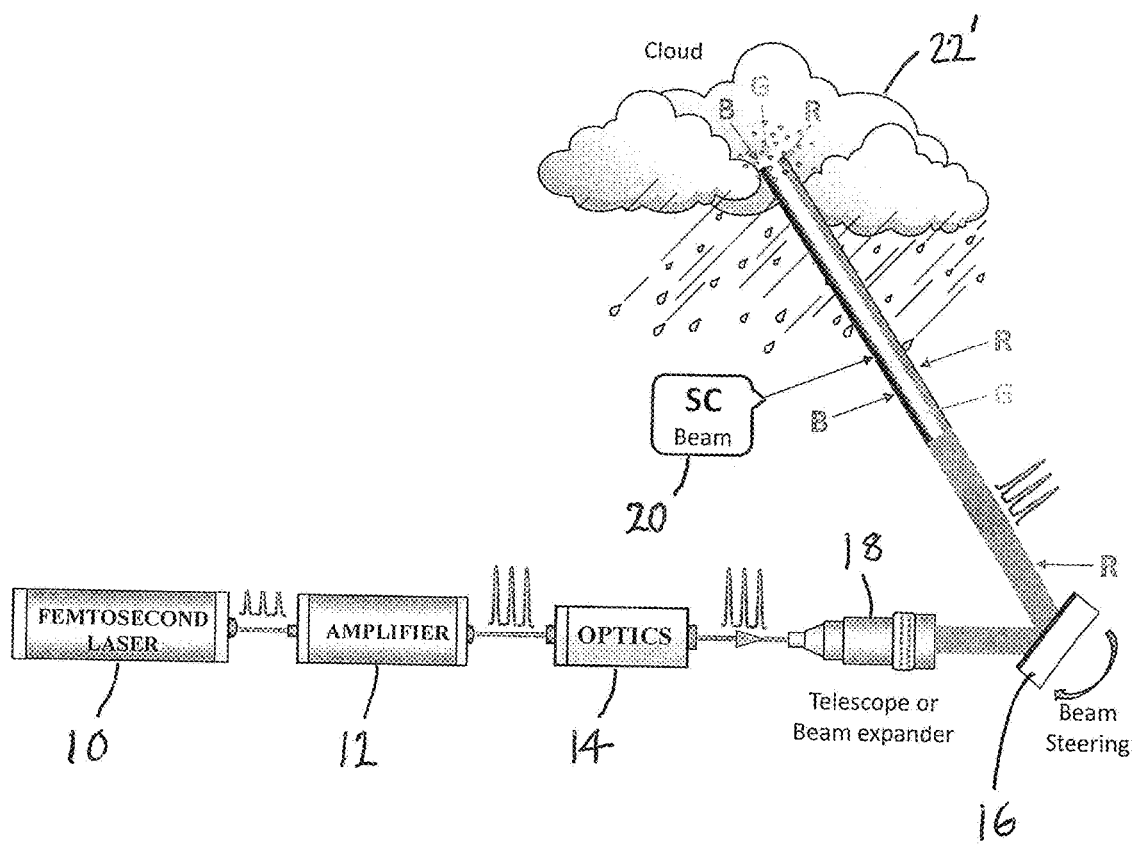
FIG. 2 is similar to FIG. 1 but the supercontinuum laser beams have been redirected by a beam steering or deflecting member at a different region of the overhead clouds.

Referring to FIG. 1, SC is used as a fingerprint marker of formation of small scale self focus filaments which causes ionization of ions and free electrons in beam profile, Gaussian (G) and Laguerre Gaussian (LG) due to extremely high field from 800 nm, 200 mJ, 40 fs, 10 Hz repetition rate laser beam for molecules of $O_2$, $N_2$, and $H_2O$ to induce aggregation of $H_2O$ molecules to produce rain. A laser system, for example, that has the required specifications consists of a Coherent Vitara-5 oscillator and Hidra-200-USP 10 Hz amplifier 12 as well as a Continuum PL8000 YAG 10 Hz pump laser 10 together with laser beam focusing and control optics 14 are used to induce rain. A beam steering element 16 downstream of the optics and telescope or beam expander 18 is used to direct or re-direct the SC beam 20 at one or more regions of a cloud 22 or different cloud clusters 22', as suggested in FIG. 2.

Special Wave Front optical laser beams, such as Gaussian and LG are used.

Special function laser profiles are used with rings of light of the Laguerre Gaussian and Gaussian (G) beams carrying orbital angular momentum (OAM) to cover larger area in the atmosphere and create multiple filamentation channels as well as collect microparticles by means of optical traps in the beam profile. The donut wave profile will also act as a potential beam trap for micro and nanometer scale particles (i.e. water, dust, dirt, other aerosols, and cloud droplets). Pre-existing aerosols can be localized then photo-ionized by high powered, filament inducing laser pulses to form condensation nuclei. Cloud seeds can be forced into coalescence by similar manipulation to their precursors. Such seeding can be used to promote cloud condensation, droplet aggregation, and ultimately rain formation, especially in areas of low atmospheric water vapor content.

The use of 100 fs beams can be used to move nanoparticles due to electromagnetic interactions between the charge distribution of the particles, and the field of the beam. The electromagnetic field perturbations can act on the particles as a potential well to attract particles into the higher intensity region of the beam[10]. The torus shaped LG beams fill up with particles moving them from a less dense, to greater density distribution. One can take advantage of such phenomena to assist droplet collision and coalescence, the process in which microscopic cloud droplets aggregate to become macroscopic raindrops. Aerosols already in the atmosphere can be localized by one beam and ionized by the same beam or another laser to create ions that serve as nucleation sites. The presence of an electric field acts to assist in droplet coalescence.[11] Plasma channels from laser filamentation act as sources of charges and electromagnetic field fluctuations that can enhance perfectly inelastic droplet collision.

The strong electromagnetic fields generated by laser pulses can act to strip atoms and molecules of their electrons. Particularly powerful pulses can create channels of free electrons and ions known as plasmas. Furthermore, ejected electrons accelerated by electric fields crash into atoms and molecules causing further avalanche ionization. Condensation nucleation events typically involve ion "seeds" acting as a surface for water to condense onto in heterogeneous nucleation processes. This is due to the ions effectively lowering the surface tension of a droplet compared to that of pure water, and thus spontaneously invoking surrounding gaseous water into condensation. Lasers create localized regions of very powerful electric fields that exceed the binding energy of electrons and their atoms, creating ions and ejected electrons in their path, Conventional means of cloud seeding and rain induction involve the introduction of foreign ions, whereas the subject laser method involves the ionization of preexisting atmospheric constituents. Blue SC will be a fingerprint to maximize ionization.

Parameters can be adjusted to optimize the method to actual atmospheric application, showing the advantages of enhancing laser induced rain with special function, complex light. Laser power meters for instantaneous versus average power, focusing, polarization, wavelength, and beam profile amongst others, affect the ion yield of a high powered pulse in Earth's air. Aerosol type and concentration, atmospheric liquid/vaporous water content, temperature, and pressure are some environmental variables also ultimately affecting rain droplet yield and formation. LG and G beams will pull air suspended nanoparticles and high energy UV laser pulses will excite and eject their electrons. After droplets are nucleated, the LG and G Beam can pull them together increasing collision and coalescence, combining many nanoparticle nucleation sites into macroscopic rain drops. The optimal laser parameters can be adjusted to maximize nucleation and droplet yield. A particle sizer detecting suspended particle size and distribution can be used before and after execution to determine yield. A spectrophotometer detecting ultraviolet to infrared SC spectra can be used to determine concentrations of water and other compounds in localized regions.

The effects of varying specific environmental parameters (i.e. temperature, relative humidity, pressure, water content, etc.) on droplet yield can be determined by taking measurements before and after excitation. A mathematical model relationship between laser/environmental variables to condensation and water droplet yield can be developed on the basis of the foregoing. The effects of varying water vapor content on rain induction can be determined, as well as any coupling to other variables such as temperature or laser power. The method can be applied to various atmospheric conditions and climates, from places of high vapor concentration to those of low. The above-described approach will lead to developing of a clean, efficient way to induce rain without the introduction of potentially harmful foreign chemicals for seeding the medium. The High power creates the filamentation and SC are seeds for ions to Clusters for water drops to cause rain while the laser is on. The beam can be scanned across the sky to cover a large area.

The invention claimed is:

1. A method of inducing rain, comprises the steps of generating an ultra high power supercontinuum (SC) beam, from fs laser pulses; and steering said SC beam at a cloud formation to produce multiple filamentations and micro particle manipulation to ionize molecules of $O_2$, $N_2$ and $H_2O$ to induce aggregation of $H_2O$ molecules to promote the production of rain.

2. A method of inducing rain as defined in claim 1, wherein said laser pulses are 100 fs pulses.

3. A method of inducing rain as defined in claim 1, wherein said SC beam manipulates nano and micro sized particles using special function beams as potential particle traps.

4. A method of inducing rain as defined in claim 3, wherein said SC beam is a Gaussian (G) beam.

5. A method of inducing rain as defined in claim 3, wherein said SC beam is a Laguerre Gaussian (LG) beam.

6. A method of inducing rain as defined in claim 1, wherein said SC beam is used to produce ions and free electrons by the mechanism of self focus and filamentation.

7. A method of inducing rain as defined in claim 1, wherein said SC beam forms small scale self focus filaments that cause ionization of ions and free electrons in a beam profile.

8. A method of inducing rain as defined in claim 7, wherein said SC beam generates a field of 200 mJ, 40 fs pulses at 800 nm and 10 Hz repetition rate.

9. A method of inducing rain as defined in claim 1, further using a telescope to ionize air and clouds by using a beam power >200 mJ from 1 ps laser within the range of the following wavelengths 700 nm <$\lambda$<1200 nm to ionize air and clouds.

10. A method of inducing rain as defined in claim 1, wherein the SC beam is used to clear dust, dirt and other contaminants μm and nm particles.

11. Apparatus for inducing rain comprises means for generating an ultra high power supercontinuum (SC) beam, from fs laser pulses; and means for steering said SC beam at a cloud formation to produce multiple filamentations and micro particle manipulation to ionize molecules of $O_2$, $N_2$ and $H_2O$ to induce aggregation of $H_2O$ molecules to promote the production of rain.

12. Apparatus as defined in claim 11, wherein said means for generating said SC beam comprises a laser for generating 100 fs pulses.

13. Apparatus as defined in claim 11, wherein said means for generating said SC beam comprises means for generating a Gaussian (G) beam.

14. Apparatus as defined in claim 11, wherein said means for generating said SC beam comprises means for generating a Laguerre Gaussian (LG) beam.

15. Apparatus as defined in claim 11, wherein said means for generating said SC beam comprises means for generating a beam that generates a field of 200 mJ, 40 fs pulses at 800 nm and 10 Hz repetition rate.

16. Apparatus as defined in claim 11, wherein means for generating said SC beam comprises a telescope to ionize air and clouds by using a beam power >200 mJ from 1 ps laser within the range of the following wavelengths 700 nm $<\lambda<$1200 nm to ionize air and clouds.

\* \* \* \* \*